… … …

United States Patent Office 3,022,272
Patented Feb. 20, 1962

3,022,272
PROCESS FOR THE PRODUCTION OF HIGH MOLECULAR POLYCARBONATES
Hermann Schnell, Krefeld-Uerdinger, and Gerhard Fritz, Krefeld-Bockum, Germany, assignors to Farbenfabriken Bayer Aktiengesellschaft, Leverkusen, Germany, a corporation of Germany
No Drawing. Filed Oct. 8, 1956, Ser. No. 614,340
Claims priority, application Germany Dec. 21, 1955
10 Claims. (Cl. 260—47)

For the production of polyesters from dicarboxylic acids and dihydroxy compounds, the free acids can be esterified with dihydroxy compounds with separation of water at elevated temperatures. High molecular film and fibre-forming products are only obtainable according to this process with difficulty. For the production of high molecular polyesters it has therefore been preferred to inter-esterify dihydroxy compounds with dicarboxylic acid esters of volatile hydroxy compounds with separation of the volatile compound.

Although the esterification can normally be carried out even without catalysts with considerable speed it is in general necessary in inter-esterification to use basic catalysts. According to the conventional inter-esterification process the added catalysts remain in the end product.

If alkali catalysts are added in the inter-esterification of aliphatic or aromatic dihydroxy compounds with dicarbonates of volatile aliphatic or aromatic compounds, no high molecular film or fibre products are formed in general because these catalysts decompose high molecular polycarbonates.

Processes have therefore hitherto been operated by beginning the reaction of aliphatic dihydroxy compounds with the carbonates of mono-hydroxy compounds in the presence of non-volatile, only slightly water soluble, carboxylic acids and a more than equivalent amount of an alkali metal, dissolving the low molecular product first formed in a solvent, removing the alkali metal by extraction with dilute acid, e.g. aqueous hydrochloric acid, without removing the carboxylic acid and then after distilling off the solvent, completing the reaction to form a high molecular film- and fibre-forming product.

This process is unduly involved. The added non-volatile carboxylic acid which is not water soluble remains in the high molecular polyester. Acid and basic components alike tend during the working up, especially of high melting high molecular polycarbonates from the melt, to spoil the structure with the formation of gaseous carbonic acid. This gas blowing makes the production of good shaped bodies such as films, fibres and bristles from the melt practically impossible. Mou'dings from polycarbonates made in this way are seriously lacking in fastness to water especially at high temperatures.

Aromatic dihydroxy compounds however, can indeed be converted during the complete inter-esterification period in the presence of suitable basic catalysts into the high molecular film- and fibre-forming state. But the catalysts remaining in the end product spoil the structure during working up in this case also with formation of carbonic acid. Blown melts are thus obtained which make working up difficult or impossible. Mouldings produced from these melts show a reduced stability to elevated temperatures and to water, especially to hot water.

It has now been found that this drawback, in the inter-esterification of aliphatic, cycloaliphatic or aromatic dihydroxy compounds with dicarbonates of aliphatic or aromatic mono-hydroxy compounds or in the polycondensation of diaryl-, dialkyl- or dicycloalkyl-dicarbonates of aromatic dihydroxy compounds of themselves or with aliphatic, cycloaliphatic or aromatic dihydroxy compounds, in the presence of basic inter-esterification catalysts, according to the processes as described in the copending U.S. patent applications Ser. Nos. 461,938, 557,256, 572,793, 572,802, 583,382 and 596,398, so far as those applications refer to inter-esterification processes, can be overcome if these basic catalysts are neutralised towards the end of the inter-esterification by adding base-binding materials to the melt.

The process according to the invention can be used with advantage for the production of polycarbonates from e.g. aliphatic dihydroxy compounds such as diethylene glycol, triethylene glycol, polyethylene glycol, thiodiglycol and the di- or poly-glycols produced from propylene oxide-1,2,butanediol-1,4, hexanediol-1,6, octanediol-1,8, decanediol-1,10, m-, p-xylylene glycol; from cycloaliphatic dihydroxy compounds such as cyclohexane diol-1, 4, 2,2-di-(p-hydroxycyclohexyl)-propane and 2,6-dihydroxy-decahydronaphthalene; from aromatic dihydroxy compounds such as hydroquinone, resorcinol, 4,4'-dihydroxydiphenyl, 1,4-dihydroxynaphthalene, 1,6-dihydroxynaphthalene, 2,6-dihydroxynaphthalene, 1,5-dihydroxyanthracene and m-, p-hydroxybenzyl alcohol or mixtures of such dihydroxy compounds, but especially such as di-monohydroxyarylene-alkanes, like di-(p-hydroxyphenylene)-methane, 2,2-di-(p-hydroxyphenylene)-propane, 1,1-di-(p-hydroxyphenylene)-cyclohexane, 1,1-di-(p-hydroxy-m-methylphenylene)-cyclohexane, 3,4-di-(p-hydroxyphenylene)-hexane, 1,1-di-(p-hydroxyphenylene)-1-phenyl-ethane, 2,2-di-(p-hydroxyphenylene)-butane, 2,2-di-(p-hydroxyphenylene)-pentane, 3,3-di-(p-hydroxyphenylene)-pentane, 2,2-di-(p-hydroxyphenylene)-3-methyl-butane, 2,2 - di - (p - hydroxyphenylene) - hexane, 2,2 - di - (p-hydroxyphenylene)-4-methyl-pentane, 2,2-di-(p-hydroxyphenylene)-heptane, 4,4-di-(p-hydroxyphenylene)-heptane and 2,2-(p-hydroxyphenylene)-tridecane.

As suitable dicarbonates for inter-esterification with the dihydroxy compounds there are mentioned aliphatic diesters such as diethyl-, dipropyl-, dibutyl-, diamyl-, di-octyl-, methylethyl-, ethylpropyl- and ethylbutyl-carbonates; cycloaliphatic diesters such as dicyclohexyl- and dicyclopentyl-carbonate, preferably however, diarylesters, such as diphenyl- and ditolylcarbonate; furthermore mixed esters such as methylcyclohexyl-, ethylcyclohexyl-, methylphenyl-, ethylphenyl- and cyclohexylphenyl-carbonate.

If desired, one also can start from compounds such as dialkyl-, dicycloalkyl-, diaryl- or mixed dicarbonates of aromatic dihydroxy compounds which inter-esterify when heated by themselves with separation of the corresponding dicarbonates or when heated with dihydroxy compounds with separation of the mono-hydroxy compounds, e.g. according to the process described in the copending U.S. patent application Ser. No. 596,398.

As basic catalysts there can be added: alkali metals, such as lithium, sodium, potassium; alkaline earth metals, such as magnesium, calcium, barium; alcoholates of the alkali- or alkaline earth metals, such as sodium methylate and calciummethylate; phenolates, such as sodium phenolate; sodium salts of dimonohydroxyarylene-alkanes; hydrides of the alkali- and alkaline earth metals such as lithium hydride and calcium hydride, oxides of the alkali- and alkaline earth metals such as lithium oxide and sodium oxide, amides of the alkali and alkaline earth metals, such as sodium amide and calcium amide, basic reacting salts of the alkali- and alkaline earth metals with organic or inorganic acids such as sodium acetate, sodium benzoate and sodium carbonate.

In order to neutralise these basic catalysts a large variety of base-binding organic or inorganic substances can be added in accordance with the invention e.g. aromatic sulphonic acids such as p-tolyl sulphonic acid, organic acid halides such as stearyl chloride, butyryl chloride, benzoyl chloride, and toluene sulphochloride, organic chlorocarbonates such as phenyl chloroformate, p-hydroxydiphenyl chloroformate, and bischloroformates of di-monohydroxy arylene alkanes, dialkylsulphates such as dimethyl sulphate and bibutyl sulphate, organic chlorine compounds such as benzoyl chloride and ω-chloroacetophenone as well as acid salts of polycondensation inorganic acids such as ammonium hydrogen sulphate.

Base-binding substances which are volatile under greatly reduced pressure at esterification temperatures are especially suitable since an incidental excess over that required to neutralise the basic catalysts can be easily removed from the melt. Dimethyl sulphate, phenylchloroformate and benzoyl chloride are examples of substances of this group.

In order to operate the process the inter-esterification is brought about between the dihydroxy compounds and the di-carbonates of mono-hydroxy compounds, or the polycondensation of the bis-phenyl-alkyl- or cycloalkyl-carbonates of the aromatic dihydroxy compounds is brought about with the aforementioned basic catalysts in a customary manner, preferably at temperatures of from 50 to 330° C., especially between 100–300° C. and continued by distilling off the volatile hydroxy compounds or the neutral carbonate of the mono-hydroxy compounds, at elevated temperature, preferably in vacuo, and with introduction of nitrogen, until the desired degree of condensation is completely or nearly attained.

According to the present invention the base-binding substances are now introduced into the viscous melt. This can be done by stirring into the viscous melt the exactly calculated quantity for neutralising the basic catalysts or by introducing, optionally together with an indifferent gaseous carrier such as nitrogen, a volatile base-binding substance in vapour form. When volatile base-binding substances are used an excess over the quantity used to neutralise the basic catalyst can be removed later by evacuation.

After the neutralisation of the catalysts, the inter-esterification can if necessary be further continued to a limited extent for the attainment of a desired molecular weight.

After the end of the poly-condensation the polycarbonate melt formed is converted by conventional methods into granular form or directly into moulded bodies, films, fibres or bristles or the like. The polycarbonates obtained may be worked up from the melt without involving the destructive influence of carbonic acid blowing, since even with prolonged heating over their melting points, they develop no carbonic acid. Shaped bodies produced from the melt display an especially good stability to elevated temperatures even in the presence of water.

The following examples are given for the purpose of illustrating the invention, the parts being by weight.

*Example 1*

A mixture of 40 parts of hexanediol-1,6
42 parts of diethylcarbonate, and
0.003 part of sodium ethylate are heated for half an hour to 100–130° C. under reflux with stirring and with introduction of nitrogen. The ethyl alcohol separated by esterification is distilled off. After a further 3 hours' stirring at 200° C. under a pressure of 30 mm. mercury gauge the sodium ethylate used as catalyst is neutralised by stirring 0.1 part of phenylchloroformate into the melt. Finally, the condensation is completed within 3 hours by heating to 250° C. under a pressure of 0.5 mm. mercury gauge. The excess of neutralising agent is then distilled off. A viscous melt is obtained which solidifies to a colourless high-polymeric body, which possesses the K-value of 65.4 measured in m-cresol and which may be worked up from the melt into extendable fibres and films. The softening point lies about 60° C.

*Example 2*

A mixture of 45.6 parts of 2,2-di-(p-hydroxyphenylene)-propane
47.1 parts of diphenylcarbonate, and
0.008 part of lithium hydride are melted together under a nitrogen atmosphere with stirring at 110–150° C. The phenol which separates is distilled off by further heating to 210° C. under a pressure of 20 mm. mercury gauge. The pressure is then reduced to 0.2 mm. mercury gauge and the temperature raised for one hour to 250° C., and for two further hours to 280° C. At the end of the condensation the catalyst is neutralised by stirring 0.05 part of dimethylsulphate into the melt. The excess of neutralising agent is finally removed by further heating under reduced pressure. A viscous melt is obtained which solidifies to a thermoplastic material melting at 240° C. which is suitable, e.g. for the production from the melt or from solutions, for example in methylene chloride, of injection mouldings and bristles, films and fibres which can be orientated by stretching. The K-value measured in m-cresol is 51. Mouldings of the material are stable at working temperatures up to more than 300° C. without decomposition or evolution of carbonic acid. Moulded bodies produced from the melt withstand elevated temperatures, even in the presence of water, for long periods.

*Example 3*

A mixture of 550 parts of the bis-(phenylcarbonate) of 2,2-di-(p-hydroxyphenylene)-propane, 228 parts of 2,2-di-(p-hydroxyphenylene)-propane and 0.015 part of the sodium salt of 2,2-di-(p-hydroxyphenylene)-propane are melted together with stirring under nitrogen. At temperature between 120–200° C. the phenol which separates is distilled off at 20 mm. mercury gauge. Finally by further three hours' heating at 280° C. under a pressure of 0.5 mm. mercury gauge a highly viscous melt is obtained. The alkali remaining in the catalyst is then neutralised by the addition of 0.3 part of dimethylsulphate to the melt and the excess of neutralising agent removed in vacuum. A highly colourless melt is obtained which solidifies to a material with a K-value measured in m-cresol of 53 and possessing the properties described in Example 1.

*Example 4*

A mixture of 550 parts of 2,2-di-(p-hydroxyphenylene)-butane, 650 parts of diphenyl carbonate and 0.025 part of the potassium salt of 2,2-di-(p-hydroxyphenylene)-propane are melted together with stirring at 120° C. under nitrogen. The phenol which separates in the inter-esterification distils off almost completely at the temperatrue (of the melt) of 120–180° C. in the course of 30 minutes at 20 mm. mercury gauge. After further stirring and heating to 280° C. at 0.5 mm. mercury gauge the polycondensation is completed. The alkali contained in the catalyst is then neutralised by introducing 0.8 part of dimethylsulphate vapour with nitrogen as a carrier. Finally the melt is stirred for a further half an hour at 0.5 mm. mercury gauge at 280° C. whereby the excess of dimethylsulphate is distilled off. The polycarbonate is obtained with a K-value of 48 measured in m-cresol which melts at 210° C. and which can be worked up without evolution of carbonic acid at temperatures up to over 300° C. into injection moulds, expendable fibres, films and the like. The shaped bodies produced from the polycarbonate display an unusual stability to elevated temperatures, even in the presence of moisture.

*Example 5*

A mixture of 45 parts of 2,2-di-(p-hydroxyphenylene)-propane, 50 parts of di-o-cresylcarbonate, 0.007 part of calciumhydride and 0.01 part of sodium benzoate are melted together with stirring under nitrogen. The greater part of the phenol which separates distills off at temperatures of 140–200° C. at 20 mm. mercury gauge. After a further 3 hours heating at 280° C. at 0.5 mm. mercury gauge, 0.1 part of ammonium hydrogen sulphate are stirred into the highly viscous melt obtained. The melt is then stirred for a further half an hour at 280° C. and 0.5 mm. mercury gauge whereby the excess ammonium hydrogen sulphate is removed. A highly viscous melt is obtained of a polycarbonate with the K-value of 49 measured in m-cresol and with the properties described in Example 2.

*Example 6*

A mixture of 46.8 parts of bis-phenylcarbonate of 2,2-di-(p-hydroxyphenylene)-propane, 0.008 part of calcium hydride and 0.008 part of sodium benzoate is melted together under nitrogen and with stirring. The diphenyl carbonate split off is distilled off at 200° C. under a pressure of 2 mm. mercury gauge. After further heating to 280° C. at a pressure of 0.2 mm. mercury gauge the alkali catalyst is neutralised by stirring in 0.05 part of dimethyl sulphate. The mixture is then stirred for a further half an hour at 280° C. at 0.2 mm. mercury gauge pressure, whereby the excess of dimethyl sulphate is removed and a colourless high molecular weight thermoplastic polycarbonate is obtained which softens at about 230° C., possesses a K-value of 52 measured in m-cresol and can be worked up from solutions, e.g. in methylene chloride or from the melt, into stretchable filaments or fibres and injection mouldings.

*Example 7*

A mixture of 38 parts of the bis-phenylcarbonate of 2,2-di-(p-hydroxyphenylene)-propane and 0.8 part of the bis-ethylcarbonate of 2,2-di-(p-hydroxyphenylene)-propane and 0.001 part of the sodium salt of 2,2-di-(p-hydroxyphenylene)-propane is melted together under a nitrogen atmosphere with stirring. The neutral carbonate formed is distilled off at 200° C. under a pressure of 5 mm. mercury gauge. By further heating to 260–280° C. under a pressure of 0.2 mm. mercury gauge, a highly viscous melt is obtained into which 0.05 part of phenylchlorocarbonate are stirred to neutralise the alkali. The excess of phenylchlorocarbonate is then removed by half an hour's stirring at 280° C. and at 0.2 mm. mercury gauge pressure. The colourless high molecular weight resin so produced with a softening point of about 230° C. and the K-value of 51 measured in m-cresol shows the same properties as the product described in Example 1.

*Example 8*

15 parts of the bis-(phenyl carbonate) of the resorcinol (melting point 124–125° C.) and 0.01 part of the sodium salt of the 2,2-(4,4'-dihydroxy-diphenylene)-propane are melted together under nitrogen and with stirring. At 200° C. and under a pressure of 12 mm. mercury gauge the splitting off of the diphenyl carbonate begins. After half an hour the pressure is reduced to 12 mm. mercury gauge and the melt is stirred for 2 hours at 220° C. The melt slowly becomes high viscous and is heated for further 2 hours at 250° C. and finally for a further hour at 270° C. under 0.5 mm. mercury gauge. Then 0.05 part of phenylchlorocarbonate is mixed in and the excess of this compound is distilled off in vacuo. A yellowish thermoplastic polycarbonate is obtained which melts at about 210° C. It may be worked up from solutions of from the melt into mouldings.

We claim:

1. In the process of producing highly polymeric fibre and film forming polycarbonates by interesterifying reaction mixtures selected from the group consisting of (a) dicarbonates selected from the group consisting of aliphatic, cycloaliphatic and aromatic diesters of carbonic acid and organic dihydroxy compounds selected from the group consisting of aliphatic, cycloaliphatic and aromatic dihydroxy compounds, (b) bis-carbonates selected from the group consisting of bis-alkyl, bis-cycloalkyl and bis-aryl carbonates of aromatic dihydroxy compounds and said organic dihydroxy compounds, and (c) said bis-carbonates of aromatic dihydroxy compounds with themselves, at temperatures from about 50 to about 330° C. in the presence of a basic interesterification catalyst until highly polymeric polycarbonates are obtained, the improvement which comprises neutralizing the basic catalyst at the end of the interesterification reaction by adding to the melt a base-neutralizing compound selected from the group consisting of phenylchloroformate, aromatic sulfonic acid halide, ω-chloroacetophenone, dialkyl sulphate and ammonium hydrogen sulphate in an amount at least equivalent to the amount of the basic catalyst employed in said interesterification reaction.

2. In the process of producing highly polymeric fiber and film-forming polycarbonates by interesterifying reaction mixtures selected from the group consisting of (a) dicarbonates selected from the group consisting of aliphatic, cycloaliphatic and aromatic diesters of carbonic acid and organic dihydroxy compounds selected from the group consisting of aliphatic, cycloaliphatic and aromatic dihydroxy compounds, (b) bis-carbonates selected from the group consisting of bis-alkyl, bis-cycloalkyl and bis-aryl carbonates of aromatic dihydroxy compounds and said organic dihydroxy compounds, and (c) said bis-carbonates of aromatic dihydroxy compounds with themselves, at temperatures from about 50 to about 330° C. in the presence of a basic interesterification catalyst and condensing until highly polymeric polycarbonates are obtained, the improvement which comprises neutralizing the basic catalyst after the liberation of substantially all of the theoretically obtainable monohydroxy component of the carbonate by adding to the melt a base-neutralizing compound selected from the group consisting of phenylchloroformate, aromatic sulfonic acid halide, ω-chloroacetophenone, dialkyl sulphate and ammonium hydrogen sulphate, in an amount at least equivalent to the amount of the basic catalyst employed in said interesterification reaction, and continuing the condensation until the desired molecular weight of the polycarbonates is obtained.

3. The process of claim 2 wherein the base-neutralizing compound is volatile at a temperature below the decomposition temperature of the resulting polycarbonate, and excess base-neutralizing compound is removed by distillation.

4. In the process of producing highly polymeric fiber and film-forming polycarbonates by interesterifying reaction mixtures selected from the group consisting of (a) dicarbonates selected from the group consisting of aliphatic, cycloaliphatic and aromatic diesters of carbonic acid and organic dihydroxy compounds selected from the group consisting of aliphatic, cycloaliphatic and aromatic dihydroxy compounds, (b) bis-carbonates selected from the group consisting of bis-alkyl, bis-cycloalkyl and bis-aryl carbonates of aromatic dihydroxy compounds and said organic dihydroxy compounds, and (c) said bis-carbonates of aromatic dihydroxy compounds with themselves, at temperatures from about 50 to about 330° C. in the presence of a basic interesterification catalyst and condensing until highly polymeric polycarbonates are obtained, the improvement which comprises neutralizing the basic catalyst after the liberation of substantially all of the theoretically obtainable monohydroxy component of the carbonate by adding to the melt a base-neutralizing compound selected from the group consisting of phenylchloroformate, aromatic sulfonic acid halide, ω-chloroacetophenone, dialkyl sulphate and ammonium hydrogen sulphate in an amount at least equivalent to the amount of the basic catalyst employed in said interesterification reaction.

5. The process of claim 4 wherein the base-neutralizing compound is volatile at a temperature below the decomposition temperature of the resulting polycarbonate, and excess base-neutralizing compound is removed by distillation.

6. The process for the production of a high molecular fibre- and film-forming polycarbonate which comprises heating a mixture of hexanediol-1,6,diethylcarbonate and a catalytic amount of sodium ethylate at temperatures of from about 50 up to 250° C. under stirring and under reduced pressure, adding phenylchloroformate in excess of that required for sodium ethylate neutralization to the melt before the polycondensation is completed, and distilling off excess phenylchloroformate under reduced pressure.

7. The process for the production of a high molecular fibre- and film-forming polycarbonate which comprises heating a mixture of bis-(phenylcarbonate) of 2,2-di-(p-hydroxyphenylene)-propane, 2,2-di-(p-hydroxyphenylene)-propane and a catalytic amount of the sodium salt of 2,2-di-(p-hydroxyphenylene)-propane under stirring at temperatures of from about 50 up to 280° C. and under reduced pressure, adding di-methyl sulphate in excess of that required for neutralizing said sodium salt to the melt at the end of the polycondensation reaction and removing excess di-methyl sulphate under reduced pressure.

8. The process for the production of a high molecular fibre- and film-forming polycarbonate, which comprises heating a mixture of 2,2-di-(p-hydroxyphenylene)-propane, di-o-cresylcarbonate and a catalytic amount of calcium hydride and sodium benzoate under stirring to temperatures of from about 50 up to 280° C. and under reduced pressure, adding ammonium hydrogen sulphate in excess of that required for neutralizing said catalyst to the melt and removing excess neutralizing agent under reduced pressure.

9. The process for the production of a high molecular fibre- and film-forming polycarbonate which comprises heating a mixture of bis-(phenylcarbonate) of 2,2-di-(p-hydroxyphenylene)-propane and a catalytic amount of calcium hydride and sodium benzoate under stirring to temperatures of from about 50 up to 280° C. and under reduced pressure, adding di-methyl sulphate in excess of that required for neutralizing said catalyst to the melt and removing excess neutralizing agent under reduced pressure.

10. The process for the production of a high molecular fibre- and film-forming polycarbonate, which comprises heating a mixture of the bis-(phenylcarbonate) of resorcinol and a catalytic amount of the sodium salt of 2,2-di-(p-hydroxyphenylene)-propane under stirring at temperatures of from about 50 up to 270° C., adding phenylchlorocarbonate in excess of that required for neutralizing said sodium salt to the melt at the end of the polycondensation reaction and removing excess neutralizing agent under reduced pressure.

References Cited in the file of this patent

UNITED STATES PATENTS

| | | |
|---|---|---|
| 1,995,291 | Carothers | Mar. 26, 1935 |
| 2,210,817 | Peterson | Aug. 6, 1940 |
| 2,739,957 | Billica et al. | Mar. 27, 1956 |
| 2,789,968 | Renolds et al. | Apr. 23, 1957 |
| 2,808,390 | Caldwell | Oct. 1, 1957 |

FOREIGN PATENTS

| | | |
|---|---|---|
| 650,002 | Great Britain | Feb. 7, 1951 |
| 546,377 | Belgium | Mar. 23, 1956 |